United States Patent [19]

Hizuka

[11] Patent Number: 5,694,217
[45] Date of Patent: Dec. 2, 1997

[54] INTERFEROMETER FOR TESTING FORMS OF SURFACE AND STRESS AND STRAIN

[75] Inventor: Masatoshi Hizuka, Omiya, Japan

[73] Assignee: Fuji Photo Optical Co., Ltd., Omiya, Japan

[21] Appl. No.: 614,939

[22] Filed: Mar. 11, 1996

[30] Foreign Application Priority Data

May 23, 1995 [JP] Japan .................................. 7-148310

[51] Int. Cl.$^6$ .................................................. G01B 9/02
[52] U.S. Cl. ................................... 356/351; 356/359
[58] Field of Search ................................ 356/345, 357, 356/351, 359, 360

[56] References Cited

U.S. PATENT DOCUMENTS 5,557,408  9/1996  Kanaya ............................ 356/360

*Primary Examiner*—Frank G. Font
*Assistant Examiner*—Robert Kim
*Attorney, Agent, or Firm*—Ronald R. Snider

[57] ABSTRACT

A $\lambda/4$ plate is inserted into and retracted from an optical path of polarized light, thereby making it possible to select whether a noise component due to the stress strain within a test object is to be presented in fringes or not. As an operator operates an operation mechanism for a $\lambda/4$ plate (4), the $\lambda/4$ plate (4) is inserted into the optical path when a laser beam (2) should be turned into circularly polarized light, whereas the $\lambda/4$ plate (4) is retracted out of the optical path when the laser beam (2) should be turned into linearly polarized light.

10 Claims, 4 Drawing Sheets

ABSTRACT IS NOT HERE

INTERFEROMETER FOR TESTING FORMS OF SURFACE AND STRESS AND STRAIN

RELATED APPLICATIONS

This application claims the priority of Japanese Patent Application No.7-148310 filed on May 23, 1995, which is incorporated herein by reference.

BACKGROUND OF THE INVENTION

1. Field of the Invention

The present invention relates to a transmission interferometer which uses fringes formed by interference of a wave front passing through a test object and a reference wave front from a reference surface with each other to measure, for example, the forms of the front and rear surfaces of the test object and the stress strain within the test object. In particular, it relates to a transmission interferometer which is suitable for obtaining information concerning the stress strain within a lens formed by plastic molding as well as within crystals.

2. Description of the Prior Art

Since a transmission interferometer obtains fringes based on information concerning the light passing through a test object, not only the forms of the front and rear surfaces of the test object but also the stress strain within the test object, for example, can be measured.

In particular, for various small lenses such as optical pickup lenses which are mainly formed by plastic molding, the transmission interferometer is desirably used to inspect whether the stress strain caused by melt flow is within a tolerable range or not.

However, when thus plastic-mold lenses or crystals are observed with a transmission interferometer, the light entering thereinto may cause a birefringence due to the stress strain, thereby superposing a noise component caused by this birefringence upon the resulting fringes.

In most cases, this noise component appears as a line parting the fringes, whereby the fringes on both sides of this parting line become discontinuous from each other.

While such a parting line is important information for inspecting the stress strain within a test object, it may become such a great obstacle to analysis processing in computer-aided fringe scanning method (phase-shift method), for example, which has recently been becoming popular in the field of fringe analysis, that the analysis processing cannot be performed.

SUMMARY OF THE INVENTION

In view of these circumstances, the object of the present invention is to provide a transmission interferometer which can appropriately select whether a noise component due to the stress strain within a test object is to be presented in fringes or not.

In the transmission interferometer in accordance with the present invention, polarized light composed of circularly polarized light or linearly polarized light is reciprocated between a reference plate and a reference reflecting plate, between which a transparent test object is inserted, while forming fringes by optical interference of an object light component, which is a component of the polarized light passing through the test object to return to a reference surface of the reference plate, and a reference light component, which is a component of the polarized light reflected by the reference surface, with each other. The transmission interferometer in accordance with the present invention further comprises a λ/4 plate inserted into an optical path of the polarized light up to the reference surface and an operation means for inserting and retracting this λ/4 plate with respect to the optical path. Also, in the transmission interferometer in accordance with the present invention, when the polarized light is linearly polarized light, the direction of the plane of polarization of the polarized light incident on the test object is set to a direction in which a noise component in the fringes which is caused by a birefringence within the test object is minimized.

In order to separate incoming and outgoing optical paths from each other, a nonpolarizing beam splitter may be used.

Preferably, a λ/2 plate is inserted into the optical path of the polarized light so as to be rotatable around an axis which is perpendicular to the plate surface of the λ/2 plate.

According to the foregoing configuration, the λ/4 plate can be freely inserted into and retracted from the optical path of the polarized light. Since the λ/4 plate is an optical device by which linearly polarized light and circularly polarized light are interchangeable, the polarized light irradiating the test object can become linearly polarized light or circularly polarized light depending on whether the λ/4 plate is inserted into or retracted from the optical path.

Also, when the polarized light is linearly polarized light, the direction of the plane of polarization of the polarized light incident on the test object is set to a direction in which a noise component in the fringes which is caused by the birefringence within the test object is minimized.

Accordingly, when the linearly polarized light is selected, the above-mentioned noise component does not appear in the observed fringes or, if any, is very weak. Therefore, in the computerized analysis processing using fringe scanning method, obstacle is prevented from occurring due to such a noise component.

On the other hand, when circularly polarized light is selected, it contains fringes in the direction of the plane of polarization which are likely to be influenced by the above-mentioned noise component. Accordingly, the noise component such as the above-mentioned parting line of fringes may appear, based on which information concerning the stress within the test object can be obtained.

Also, in cases where a λ/2 plate is inserted into the optical path so as to be rotatable around an axis which is perpendicular to the plate surface of the λ/2 plate, when the polarized light is linearly polarized light, the λ/2 plate can be rotated so as to easily find the direction of the plane of polarization in which the noise component is the least influential to the fringes.

The positional relationship between the λ/4 plate and the λ/2 plate is such that any of them can be placed upstream of the other in cases where linearly polarized light is converted into circularly polarized light by the λ/4 plate, while the λ/4 plate must be placed upstream of the λ/2 plate when circularly polarized light is converted into linearly polarized light by the λ/4 plate.

Also, in cases where the λ/4 plate can be freely inserted into and retracted from the optical path of the polarized light, it can be retracted from the optical path when the polarized light becomes circularly polarized light, thereby making the noise less influential.

DETAILED DESCRIPTION OF THE PREFERRED EMBODIMENTS

In the following, embodiments of the present invention will be explained with reference to the attached drawings.

Figure 1:
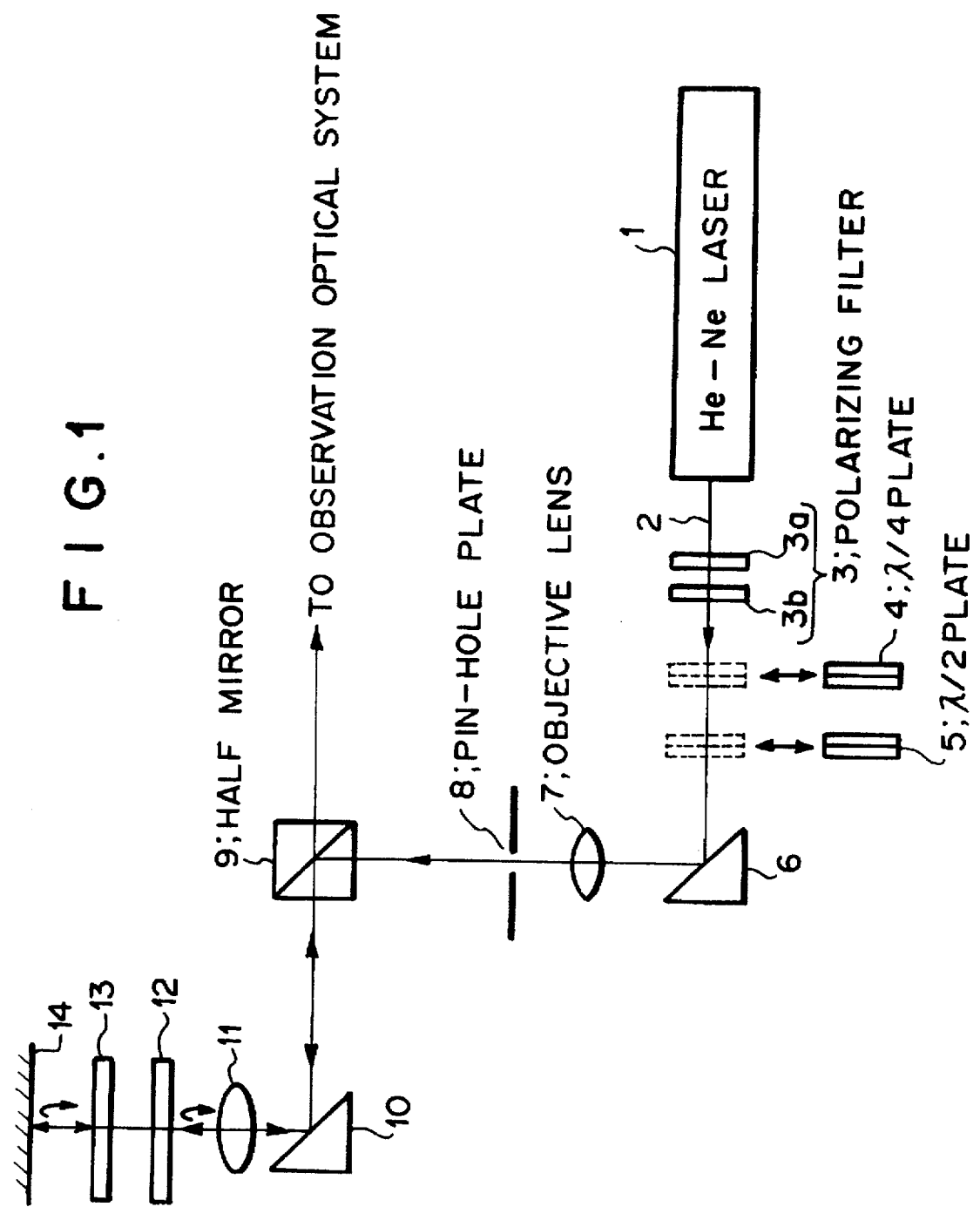
FIG. 1 is a schematic view showing the transmission interferometer in accordance with an embodiment of the present invention.

FIG. 1 is a schematic view showing an optical system of the transmission interferometer in accordance with an embodiment of the present invention. In this optical system, a laser beam 2 output from a laser source 1 (He—Ne laser at 632.8 nm with an output of 2 mW) is turned into linearly polarized light having a plane of polarization in a predetermined direction as it passes through a polarizing filter 3. Here, this polarizing filter 3 comprises a first polarizing filter 3a, which is rotatable with respect to the laser beam 2, and a fixed second polarizing filter 3b, such that the amount of light can be adjusted as the first polarizing filter 3a is rotated.

Thus linearly polarized laser beam 2 successively passes through the positions where a λ/4 plate 4 and a λ/2 plate 5 are inserted, respectively. Each of these two wavelength plates 4 and 5 can be freely inserted into and retracted from an optical path of the laser beam 2 by an inserting and retracting operation mechanism shown in FIGS. 3(A) and 3(B).

Thereafter, the laser beam 2 is rectangularly reflected by a rectangular reflecting prism 6 and then, by way of an objective lens 7, impinges on a pin-hole position of a pin-hole plate 8 whereby the noise component of the laser beam 2 is eliminated.

The laser beam 2 passing through the pin-hole plate 8 is turned into a divergent luminous flux and impinges on a nonpolarizing beam splitter 9. A part of light amount thereof is rectangularly reflected by the nonpolarizing beam splitter 9 and then rectangularly reflected by a rectangular reflecting prism 10 so as to enter a collimator lens 11 where it is turned into a parallel luminous flux incident on a reference plate 12. A part of the laser beam 2 incident on the reference plate 12 passes therethrough toward a test object 13, while the remaining part is reflected by a reference surface, which is the surface of the reference plate 12 facing the test object 13, as a reference light component.

The laser beam 2 passing through the reference plate 12 toward the test object 13 passes through the plate-like test object 13 and then is reflected by a reference reflecting surface 14 so as to pass through the test object 13 again, thereby returning to the reference surface of the reference plate 12 as an object light component, which then passes through this reference surface. Both the reference surface of the reference plate 12 and the reference reflecting surface 14 have a highly accurate flatness, while being parallel to each other. Here, both front and rear surfaces of the test object 13 are disposed substantially in parallel to the above-mentioned reference surface and the reference reflecting surface 14.

The wave front of the reference light component reflected by the reference surface and the wave front of the object light component returning to the reference surface generate an optical interference which corresponds to irregularities in the front and rear surfaces of the test object 13 and its internal stress strain. The returning light component of the laser beam 2 carrying information concerning these irregularities and information concerning this stress strain impinges on the nonpolarizing beam splitter 9 by way of the collimator lens 11 and the rectangular reflecting prism 10.

A part of the returning light component passes through the nonpolarizing beam splitter 9 so as to be emitted toward an observation optical system which projects, upon a fringe projection surface which is not depicted, an image of fringes carrying the above-mentioned information concerning the irregularities and information concerning the stress strain. The projection surface may be screen, image-pickup device, or image-pickup tube, for example.

Figure 2A:
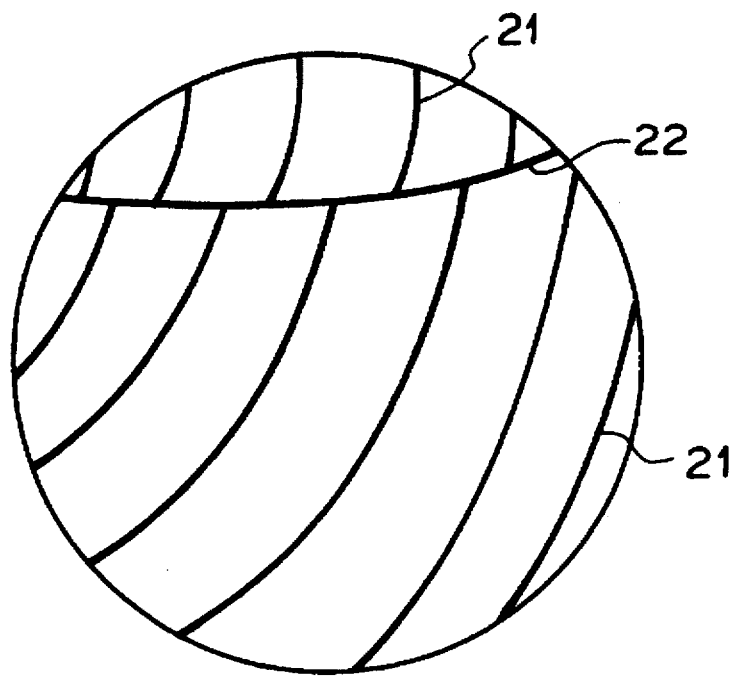
FIG. 2(A) is a view showing fringes observed when a laser is circularly polarized light.

When the test object 13 is made of molded plastics or mineral crystals, for example, its internal stress strain becomes so large that it may have a large birefringence. In the case where the laser beam 2 is circularly polarized light, when it passes through a material having a birefringence, a parting line 22 (which is a noise component for fringes 21) such as that shown in FIG. 2(A) is generated in the fringes formed on the projection surface.

Since this parting line 22 results from the stress strain within the test object 13, the information concerning the stress strain within the test object 13 can be obtained when the parting line 22 is analyzed.

However, when the parting line 22 exists in the fringes 21, the fringes 21 have a discontinuity at this parting line 22. Accordingly, when fringe scanning method (phase-shift method) is used to perform computer-aided analysis of the fringes 21, it becomes difficult for the analysis processing thereof to be performed favorably. Therefore, the parting line 22 should be eliminated from the fringes 21.

Figure 2B:
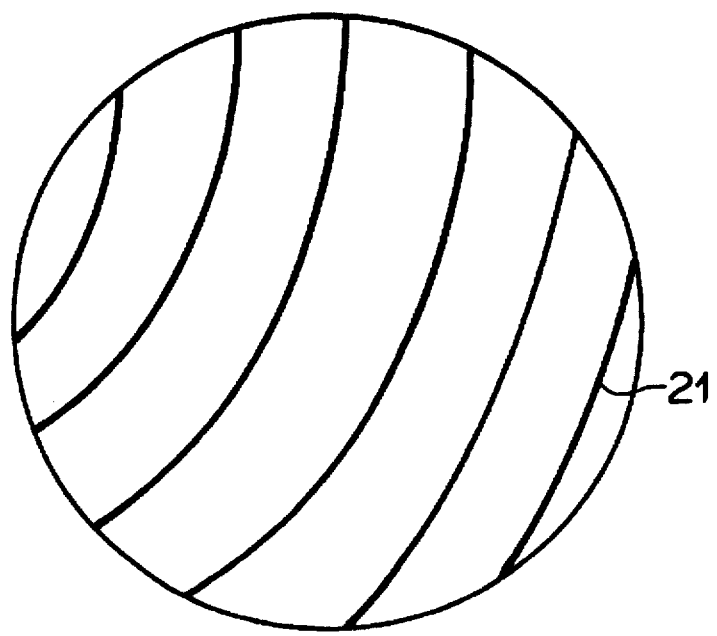
FIG. 2(B) is a view showing fringes observed when a laser is predetermined linearly polarized light.

On the other hand, in the case where the laser beam 2 is linearly polarized light, when the angle of its plane of polarization is adjusted, the fringes 21 can be obtained without the parting line 22 as shown in FIG. 2(B). Such fringes 21 can be favorably analyzed by the above-mentioned computer-aided analysis.

However, with linearly polarized light whose plane of polarization is rotated by 180 degrees with respect to the linearly polarized light by which the fringes shown in FIG. 2(B) are obtained, the parting line 22 may exist in the fringes 21 as shown in FIG. 2(A). Accordingly, it is necessary for the angle of the linearly polarized light to be sufficiently adjusted in view of the test object 13 to be handled.

Thus, when the test object 13 having an internal stress strain is measured, it is desirable for the laser beam 2 to be selectable between circularly polarized light and predetermined linearly polarized light.

Accordingly, in the transmission interferometer shown in FIG. 1, as an operator operates an operation mechanism for the λ/4 plate 4, the λ/4 plate 4 is inserted into the optical path when the laser beam 2 should be turned into circularly polarized light, whereas the λ/4 plate 4 is retracted out of the optical path when the laser beam 2 should be turned into linearly polarized light.

Further, as an operator operates an operation mechanism for the λ/2 plate 5, the λ/2 plate 5 is inserted into the optical path when the laser beam 2 is linearly polarized light, whereas the λ/2 plate 5 is retracted out of the optical path when the laser beam 2 is circularly polarized light. Also, when the laser beam 2 is linearly polarized light, the λ/2 plate 5 is rotated so as to adjust the rotational angle of its plane of polarization such that fringes without the parting line 22 as shown in FIG. 2(B) can be obtained. Accordingly, even in cases where the rotational angle of the plane of polarization by which the noise component is prevented from generating is unknown at the starting step for measurement, the fringes 21 such as those shown in FIG. 2(B) can be easily obtained. The λ/2 plate 5 is retracted out of the optical path when the laser beam 2 is circularly polarized light, in order to eliminate a minute noise component being generated when the laser beam 2 passes through the λ/2 plate 5.

Also, it is necessary for the operation mechanisms to be configured such that these wavelength plates 4 and 5 can be perpendicularly inserted into and retracted from the optical path of the laser beam 2 as well as they can be securely positioned within the optical path.

Figure 3A:
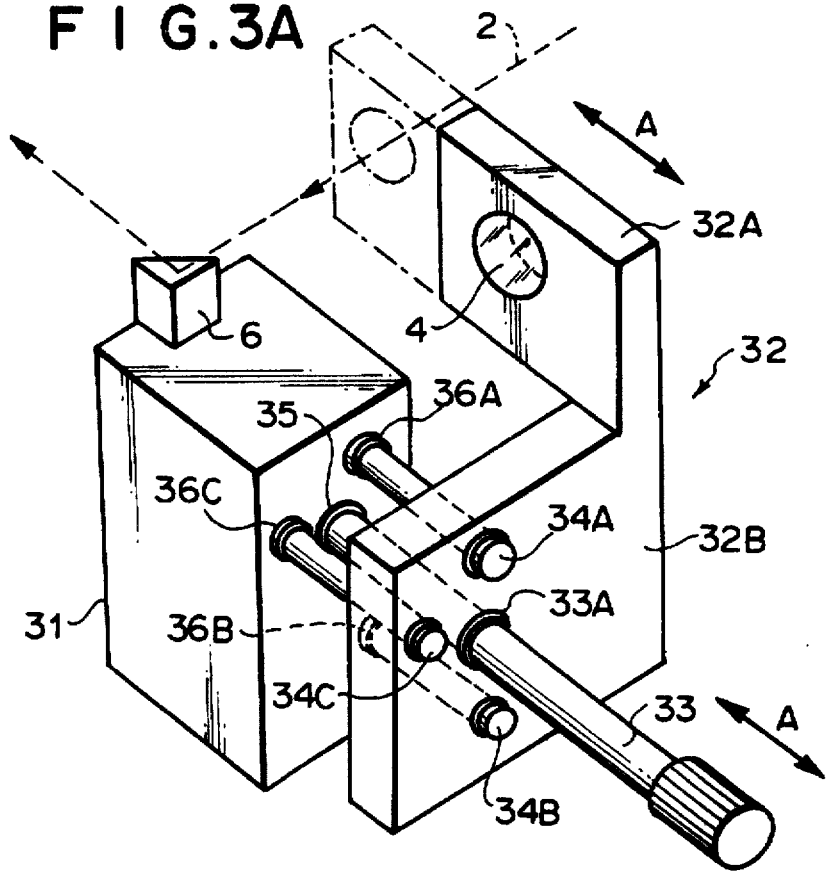
FIGS. 3(A) and 3(B) are schematic views showing a mechanism for operating the λ/4 plate in the interferometer shown in FIG. 1.
Figure 3B:
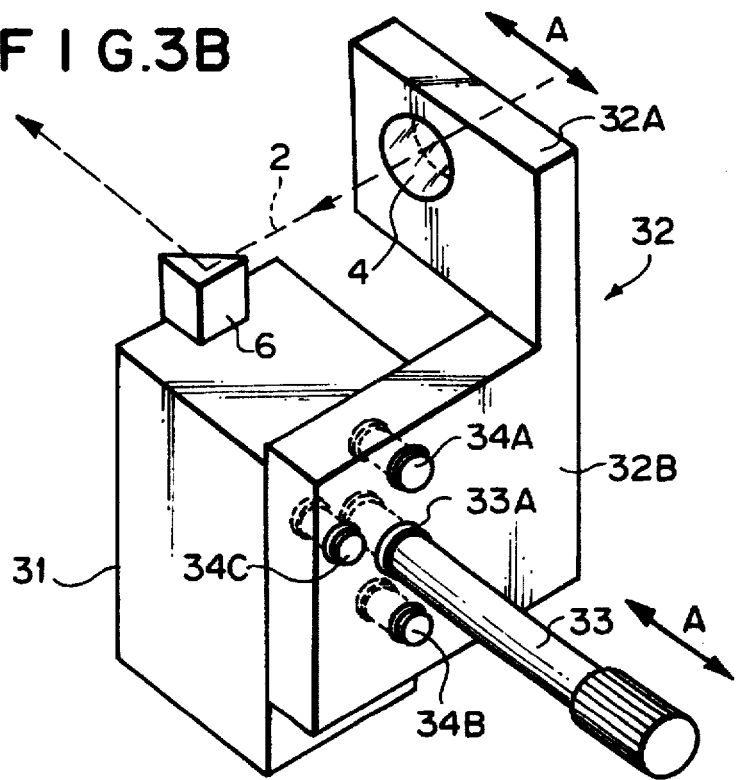

FIGS. 3(A) and 3(B) shows the operation mechanism for the λ/4 plate 4 in the transmission interferometer in the above-mentioned embodiment. Here, the explanation of the operation mechanism for the λ/2 plate 5 will be omitted since it is similar to that shown in these drawings.

This operation mechanism comprises a rectangular parallelopiped fixed portion 31; a movable portion 32 into which the λ/4 plate 4 is fitted; a pinch rod 33 for holding the movable portion 32 so as to make it movable with respect to the fixed portion 31; and three support rods 34A, 34B, and 34C. FIG. 3(A) shows a state where the λ/4 plate 4 is retracted out of the optical path of the laser beam 2, whereas FIG. 3(B) shows a state where the λ/4 plate 4 is inserted into the optical path of the laser beam 2.

The movable portion 32 is configured such that a λ/4 plate-holding plate 32A for holding the λ/4 plate 4 is fixed on a planar movable-portion-holding plate 32B such that their surface directions are orthogonal to each other. Also, the pinch rod 33 is formed so as to be securely fixed to the movable-portion-holding plate 32B at a connecting portion 33A. Further, the pinch rod 33 and the three support rods 34A, 34B, and 34C are slidably and tightly connected to the fixed portion 31 at connecting portions 35, 36A, 36B, and 36C, respectively. Here, as the movable portion 32 moves in the directions of arrows A, these pinch rod 33 and three support rods 34A, 34B, and 34C are tightly inserted into sheath portions (not depicted) which are securely fixed within the fixed portion 31. Accordingly, when the movable portion 32 is moved in the directions of arrows A, it is prevented from tilting and fluctuating. As an operator pushes and pulls the pinch rod 33 in the directions of arrows A, the λ/4 plate 4 can be inserted into and retracted from an identical position within the optical path of the laser beam 2 perpendicularly with respect to the beam direction of this laser beam 2.

On the upper surface of the fixed portion 31, the rectangular reflecting prism 6 is fixed such that the laser beam 2 is incident on a reflecting surface of the rectangular reflecting prism 6 by an incident angle of 45 degrees.

Without being restricted to the foregoing embodiment, the transmission interferometer of the present invention can be configured in various manners. For example, the λ/2 plate 5 may be omitted or the λ/2 plate 5 may be fixedly held in the optical path of the laser beam 2 such that it cannot be retracted out of the optical path.

Also, each operation for inserting and retracting the λ/4 plate 4 or the λ/2 plate 5 with respect to the optical path may be driven by an actuator based on a switch set by the operator.

Further, while the above-mentioned two wavelength plates 4 and 5 can be disposed at any position between the polarizing filter 3 and the reference plate 12, it is desirable for them to be disposed upstream of the objective lens where the beam diameter of the laser beam 2 is within a narrow range.

Also, without being restricted to a planar form such as that in the foregoing embodiment, the test object 13 may have a convex or concave form, for example. However, when the test surface is made convex or concave, a lens corresponding to such a form should be inserted between the reference plate 12 and the test object 13, while the form of the reference reflecting surface 14 should have a form corresponding to that of the test surface.

Figure 4:
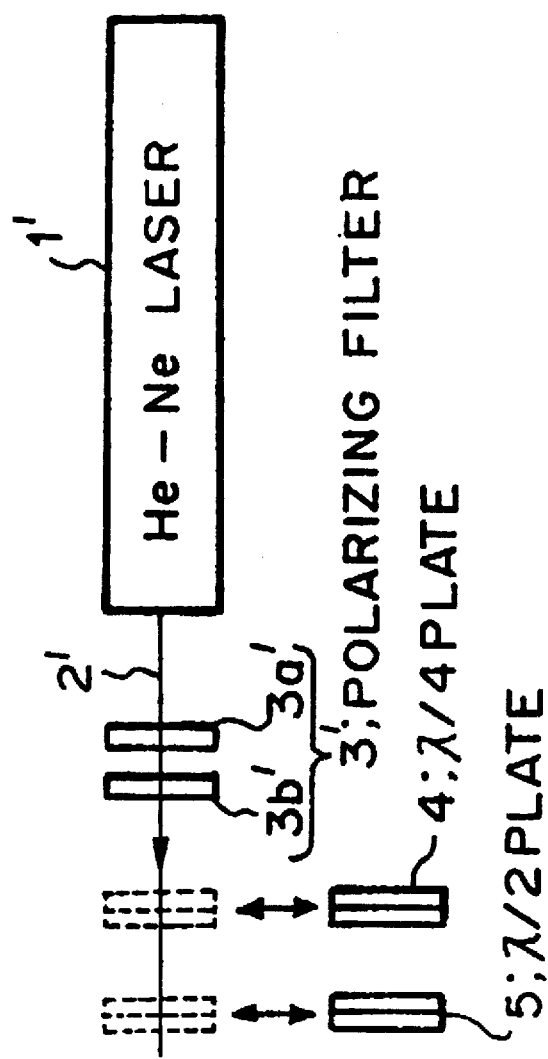
FIG. 4 shows a schematic view of the transmission interferometer in accordance with the embodiment where circularly polarized light is emitted by polarizing filter 3'.

FIG. 4 shows the case where the polarizing filter 3' produces circularly polarized light which is received by λ/4 plate 4.

What is claimed is:

1. A transmission interferometer for testing a transparent object in which either circularly or linearly polarized measuring light is inserted between a reference plate and a reference reflecting surface, wherein said transparent test object is inserted between said reference plate and said reference reflecting surface comprising in combination:

a source of polarized light;

means for forming interference fringes by optical interference of polarized light passing through said test object and returning to a reference surface of said reference plate, and of a reference light component which is a component of said polarized light reflected by said reference surface, a λ/2 plate;

a λ/4 plate;

a polarized light optical path;

means for inserting and retracting the λ/4 plate into said optical path at a location between said source of polarized light and said reference surface for converting said polarized light from circular to linear polarized light or linear to circular polarized light;

means for inserting said λ/2 plate into said optical path when said polarized measuring light is linearly polarized light, a direction of plane of polarization of said polarized light incident on said test object is set to a direction in which a noise component in the fringes which is caused by a birefringence within said test object is minimized; and wherein, when said polarized light is circularly polarized light the noise component in the fringes which is caused by birefringence is analyzed.

2. A transmission interferometer according to claim 1, further comprising a nonpolarizing beam splitter for separating a component of said polarized light directed toward said test object and a component of said polarized light returning from said test object.

3. A transmission interferometer according to claim 1, wherein said λ/2 plate is rotatable to a position where said noise caused by birefringence is minimized.

4. A transmission interferometer according to claim 1 wherein said source of polarized light is linearly polarized light.

5. A transmission interferometer according to claim 1 wherein said source of polarized light is circularly polarized light.

6. A transmission interferometer for testing a transparent object for forms of surfaces and for stress and strain comprising in combination:

a reference plate;

a reference reflecting surface;

wherein said transparent object is inserted between said reference plate and said reference reflecting surface;

a source of polarized light;

a polarized light optical path;

a means for inserting and retracting a λ/4 plate into said polarized light optical path at a location between said source of polarized light and said reference surface for converting said light from circularly to linearly polarized light or from linearly to circularly polarized light;

a λ/2 plate inserted into said polarized light optical path when linearly polarized light is inserted into said transparent object, for reducing a noise component caused by birefringence components to a minimum, and wherein said λ/2 plate is also rotatable about its own axis;

means for forming interference fringes by optical interference of polarized light passing through said test object and returning to said reference surface of said reference plate and of a reference light component which is a component of said polarized light reflected by said reference surface;

wherein interference fringes produced by forms of surfaces are measured when said inserted light is linear polarized light; and wherein interference fringes produced when said inserted polarized light is circularly polarized are used to measure stress and strain.

7. A transmission interferometer according to claim 6, further comprising a nonpolarizing beam splitter for separating a component of said polarized light directed toward said test object and a component of said polarized light returning from said test object.

8. A transmission interferometer according to claim 6, wherein said λ/2 plate is rotatable around an axis which is perpendicular to a plate surface of said λ/2 plate.

9. A transmission interferometer according to claim 6 wherein said source of polarized light is linearly polarized light.

10. A transmission interferometer according to claim 6 wherein said source of polarized light is circularly polarized light.

* * * * *